3,399,972
CHROMATOGRAPHY ANALYSIS APPARATUS AND METHOD
Leonard T. Skeggs, Kirtland, Ohio, and George N. Catravas, Yonkers, N.Y., assignors to Technicon Corporation, a corporation of New York
Filed Aug. 24, 1964, Ser. No. 391,578
6 Claims. (Cl. 23—230)

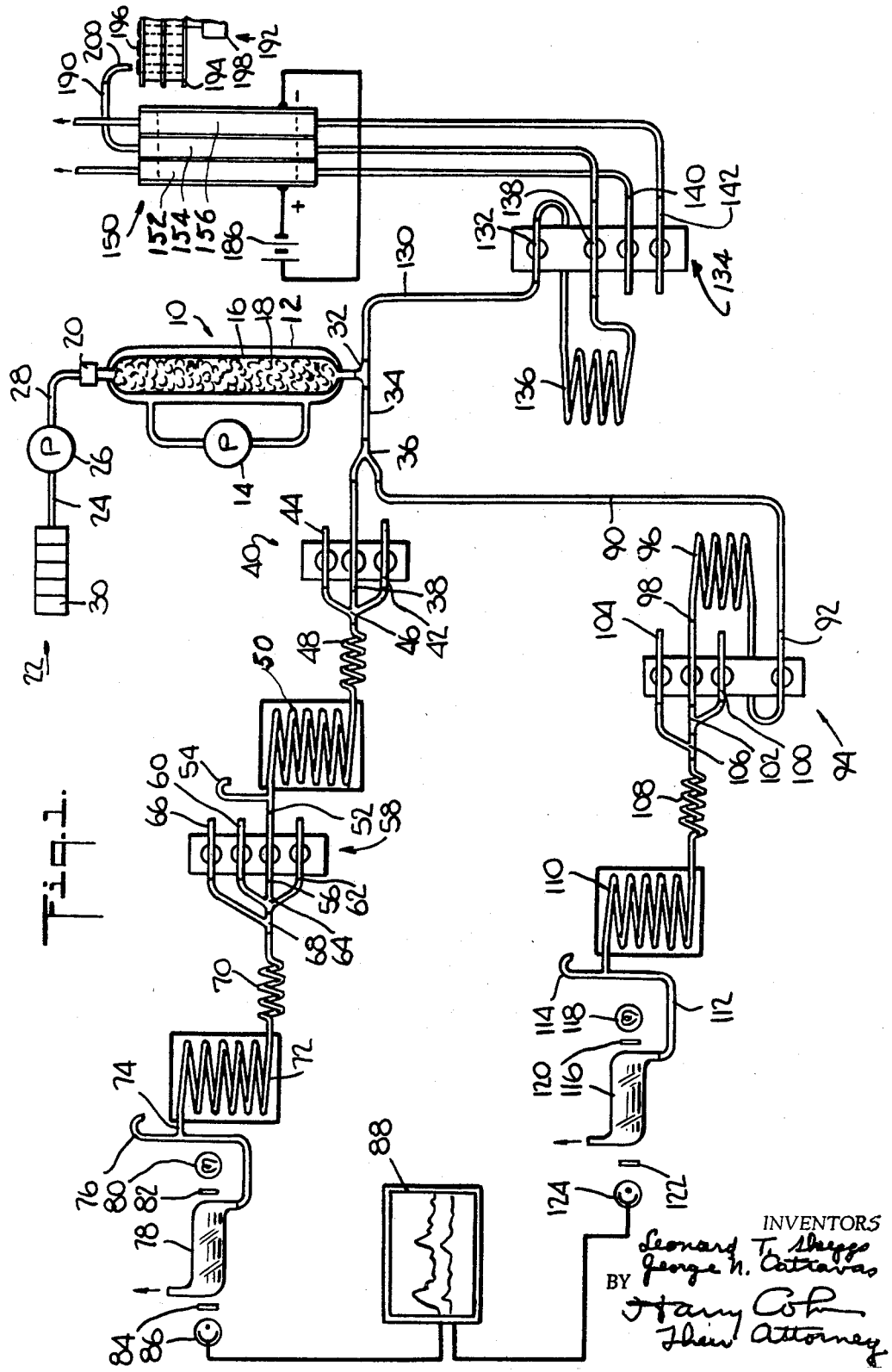

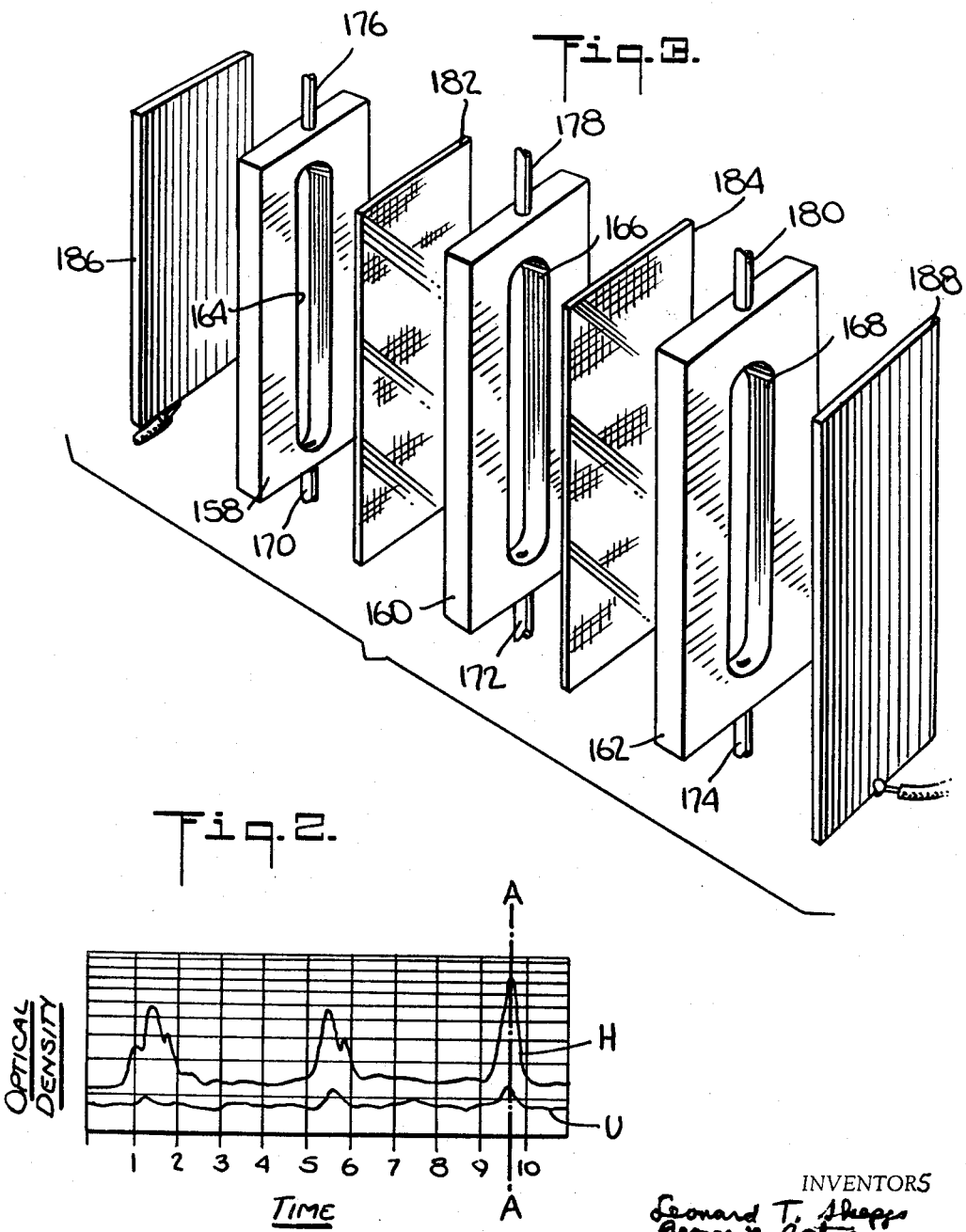

ABSTRACT OF THE DISCLOSURE

A system is provided for chromatographic analysis of peptides, wherein the effluent from a chromatographic column is divided into two main quotient streams, one of which is analyzed, the other of which passes through a desalting column and thence to a fraction collector. The desalting column includes three coextensive chambers, respectively separated by an anion exchange membrane, and cation exchange membranes, with an electric potential thereacross.

---

This invention relates to chromatography and more particularly to the analysis and desalting of a continuous flow of effluent from a chromatographic separation column.

It is known to separate peptides by the use of a chromatographic column of ion-exchange resin wherein the effluent from the column is stored in containers of relatively small volume, whereby each fraction of the effluent is separated from the preceding and succeeding fractions. Subsequently, the contents of each container may be analyzed. However, the effluent in each container will include the buffer solution which was utilized in stripping the peptides from the column, which, commonly, must be removed before further analysis operations are performed. Additionally, some of the containers contain effluent of interest, and others contain effluent which is not of interest.

An object, therefore, of this invention is the provision of an apparatus for continuously desalting the column effluent prior to its passage to storage in the fraction containers.

A feature of this invention is the provision of a chambered column for the continuous desalting of the chromatographic column effluent prior to its storage.

The above, and other objects, features and advantages of the invention which will hereinafter appear will be fully understood from the following description considered in connection with the accompanying drawings in which:

FIG. 1 is a diagrammatic representation of an apparatus embodying this invention;

FIG. 2 is a graph showing the analysis of the effluent plotted concurrently with the analyses of the hydrolyzed effluent; and FIG. 3 is a perspective exploded view of a continuous flow desalting chamber.

Turning now to the drawings, FIG. 1 shows a chromatographic column 10 having an outer tube 12 which is coupled to an adjustable temperature water circulation system 14. An inner tube 16 is packed with a suitable particulate ion-exchange resin 18 for the separation of peptides. The peptides may result from the hydrolysis of a protein. The top of the inner tube 16 is coupled to an inlet valve 20 which will admit the insertion of the mixture of peptides to be separated into the top of the inner tube 16. This valve may advantageously be of the type shown in the Winter and Catravas U.S. patent application S.N. 358,198, filed Apr. 8, 1964. The outlet of a variable gradient buffer solution supply device 22 is coupled via a conduit 24 to the input of a positive displacement pump 26. The output of the pump is coupled via a conduit 28 to the eluent input of the valve 20. The eluent supply device 22 may advantageously be of the type shown in the Isreeli U.S. Patent No. 3,137,-480, issued on June 16, 1964. Briefly described, this device comprises a series of chambers, indicated at 30, which are in fluid flow communication with each other and which respectively contain the eluting liquid or buffer of different concentrations and pH levels. The buffer may be sodium citrateacetate. The buffer flows from one chamber to the adjacent chambers and thence through the outlet from which it is pumped by the pump 26 through the column 10 at a constant rate regardless of resistant pressure. The effluent from the column passes to a T fitting 32 which directs a portion to the left to the analysis apparatus and a portion to the right to the desalting and storage apparatus.

During the flow of the eluent downwardly through the inner tube 16, the peptides absorbed by the resin in the tube are stripped and discharged in succession through the outlet T fitting 32 at the bottom of the tube 16.

The left outlet of the fitting 32 is coupled by a conduit 34 to the input of a Y fitting 36. One outlet of this fitting is coupled to a pump tube 38 of a proportioning pump 40. This proportioning pump and the others hereinafter mentioned may advantageously be of the type shown in the Isreeli and Ferrari, Jr. U.S. Patent No. 2,935,028, issued May 3, 1960. The pump 40 also includes a pump tube 42 coupled to a supply of sodium hydroxide or other suitable alkali, not shown, for hydrolyzing the peptides, and a pump tube 44 coupled to a supply of nitrogen, not shown.

The hydrolyzing apparatus is similar to that which is shown in U.S. Patent No. 3,334,969, issued to George N. Catravas on Aug. 8, 1967. The pump tubes 38, 42 and 44 are joined at a fitting 46, which couples the stream of effluent and sodium hydroxide which has been segmentized by the nitrogen, to a mixing coil 48 which in turn passes the segmentized stream of intermixed effluent and sodium hydroxide to a heating coil 50. The peptide in the effluent is hydrolyzed into its constituent amino acids in the heating coil as a continuous flow and coupled by a conduit 52 which includes a gas vent 54 for venting the segments of the nitrogen from the stream, to a pump tube 56 of a proportioning pump 58. The pump also includes a pump tube 60 coupled to a supply of neutralizing acid, such as acetic acid, not shown, and a pump tube 62 coupled to a supply of nitrogen, not shown. The pump tubes 56, 60 and 62 are joined by a fitting 64. The acid neutralizes any residual alkali in the stream, while the nitrogen segmentizes the stream. The pump further includes a pump tube 66 which is coupled to a supply of ninhydrin plus hydrindantin in methyl Cellosolve. The outlet of the fitting 64 and the pump tube 66 are joined in a fitting 68 which is coupled to the inlet of a mixing coil 70, the outlet of which is coupled to the inlet of a heating coil 72. The ninhydrin oxidizes amino acids to RCHO, $NH_3$ and $CO_2$ and affords a dihydride that combines with the ammonia to produce a pigment. The density of the stream will be responsive ot the quantity of ammonia available.

The use of continuous flow of a solution of sodium hydroxide (or potassium) permits the concentration of the solution to be kept constant. This is an advantage over a batch treatment utilizing a solution of sodium hydroxide, wherein as the batch of the solution of sodium hydroxide and the sample is heated, the water in the batch evaporates and the concentration of the solution increases, destroying the amino acids. We have found a concentration range of 3 to 4 normal in the hydrolyzing heating coil 50 at a temperature of 95° C. to be suitable, and a concentration of 3.5 normal to be desirable. Lower concentrations are inadequately effective, while higher concentrations are destructive of the amino acids.

The outlet of the heating coil 72 is coupled by a conduit 74 having a gas vent 76 to the inlet of a flow cell 78. A light source 80, a collimating lens system 82, an interference filter 84 and a light detector 86 are provided to determine the density of the color of the fluid in the flow cell. The output of the detector 86 is coupled to one input of a two-input recorder 88. The recorder plots the optical density of the continuously flowing fluid in the flow cell as a function of time.

The other outlet of the Y fitting 36 is coupled by a conduit 90 to a pump tube 92 of a proportioning pump 94. This pump tube is coupled to the inlet of a delay coil 96, the outlet of which is coupled to a pump tube 98 of the pump. The pump also includes a pump tube 100 coupled to a supply of nitrogen, not shown. The pump tubes 98 and 100 are joined by a fitting 102. A pump tube 104 is coupled to a supply ninhydrin and hydrindantin in methyl Cellosolve, not shown. The outlet of the fitting 102 and the pump tube 104 are joined by a fitting 106. The nitrogen segmentized stream of effluent and the ninhydrin are passed to a mixing coil 108, the inlet of which is coupled to the outlet of the fitting 106. The outlet of the mixing coil is coupled to the inlet of a heating coil 110, the outlet of which is coupled by a conduit 112 having a gas vent 114 to the inlet of a flow cell 116. The ninhydrin reacts with the free amino group in the peptide to form a pigment. A light source 118, a collimating lens system 120, an interference filter 122 and a light detector 124 are provided for this flow cell. The output of the light detector is coupled to the second input of the recorder 88. The length of the delay coil 96 is arranged so that the flow cells 78 and 116 at any given time contain subportions of the same fraction of the effluent stream from the chromatographic column. Thus the spectrograms from the two detectors 86 and 124 are in phase nad the recorded curves showing the ninhydrin reaction of the hydrolyzed and unhydrolyzed subportions of the effluent may be directly compared.

FIG. 2 depicts a chart produced by the recorder 86. The abscissa is a linear time scale and the ordinate is a logarithmetric optical density scale. The lower curve U is the spectrogram provided by the unhydrolyzed effluent, while the upper curve H is the spectrogram provided by the hydrolyzed effluent. The ordinate is responsive to the quantity of the individual molecules present in the liquid in the particular flow cell. Thus, the ratio of the areas under a pair of phased peaks is indicative of the number of amino acids hydrolyzed from a peptide in the particular fraction of the effluent. If, for example, the area of the H curve peak about the ordinate A is thrice that of the area of the U curve peak about the ordinate A, it may be deduced that three amino acids were hydrolyzed from this peptide. However, if one or more of the amino acids contains two amino groups rather than only one, then it will appear as if it were twice as plentiful. In any case, the peptides can be readily grouped into large and small categories by inspection of the chart.

If the ordinates of both curve peaks are very high, it may be deduced that the concentration of this peptide in the effluent is high, while if the ordinates of both curve peaks are very low, it may be deduced that the concentration of this peptide is low.

In some cases it has been observed that the hydrolyzed curve will exhibit a peak having a significant ordinate, while the equivalent unhydrolyzed curve is substantially indistinguishable from the base line. This is indicative of a peptide which has a very small amount of ninhydrin positive $NH_2$ and would not be discovered in the effluent without the hydrolyzing prior to the ninhydrin reaction.

The other outlet of the T fitting 32 is coupled by a conduit 130 to a pump tube 132 of a proportioning pump 134. This pump tube is coupled to the inlet of a delay coil 136, the outlet of which is coupled to a pump tube 138. The pump tube also includes a pump tube 140 coulped to a supply of dilute sodium hydroxide, and a pump tube 142 coupled to a supply of dilute sulphuric acid, both not shown.

A continuous flow desalting column 150 includes three chambers 152, 154 and 156 which are in mutual fluid flow communication. As shown in FIG. 3, the column is formed of three dielectric plates, 158, 160, 162, each having an elongated central cavity or cut-out 164, 166, 168 respectively. The plates also have inlet tubes 170, 172, 174 respectively, communicating with the bottoms of the cavities, and outlet tubes 176, 178, 180, respectively, communicating with the tops of the cavities. The plates may be made from a suitable transparent plastic, such as "Lucite." An anion exchange membrane 182 is sandwiched between the plates 158 and 160, and a cation exchange membrane 184 is sandwiched between the plates 160 and 162. The membranes separate the cavities 164, 166 and 168 from each other. An anode 186 is disposed adjacent the outer face of the plate 158 over the cavity 164, and a cathode 188 is disposed adjacent the outer face of the plate 162 over the cavity 168. The electrodes, plates and membranes are sandwiched together by suitable means such as machine screws or clamps, not shown, to form three chambers. A suitable souce of direct current 186 is coupled across the electrodes.

The pump tube 138 is coupled to the inlet 172 to pass the effluent to the middle chamber. The pump tube 140 is coupled to the inlet 170 to pass the dilute sodium hydroxide to the left chamber. The pump tube 142 is coupled to the inlet 174 to pass the dilute sulphuric acid to the right chamber.

With a cavity length of about 36 inches, width and depth of ¼" each, and with resin impregnated membranes, we have found a 0.2% solution of NaOH, together with a small quantity of a wetting agent, such as "Tween 20," 10 drops per liter; and 0.2% $H_2SO_4$ and a similar quantity of wetting agent; at a current flow of 0.8 to 1.0 ampere at 110 volts to be effective. As the effluent passes up through the central chamber, the highly charged salt ions from the buffer solution migrate through the membrane. If a buffer solution of sodium acetate-citrate was used, the sodium cations will migrate through the cation exchange membrane 184 towards the cathode 188, while the acetate and citrate anions will migrate through the anion exchange membrane 182 towards the anode 186. The outlets 176 and 180 are coupled to suitable sumps not shown, to pass the continuous flows of electrolytes out of the left and right chambers. The outlet 178 is coupled by a conduit 190 to a fraction collection apparatus 192. By the time the effluent has passed through the length of the cavity 166 it is substantially free of the ions of the buffer solution.

The fraction collection apparatus 192 may be of the type shown in the Gorham patent, U.S. 2,604,248, issued July 22, 1952, and comprises a rotating carrier 194 supporting a plurality of containers 196. An intermittent rotating means 198 periodically rotates an empty container below a dispensing tube 200 which is coupled to the conduit 190. Thus a predetermined fraction of the effluent from the chromatograph column is collected seriatim in each container. The quantity of effluent passing into each container is in phase with the subportion of effluent being analyzed in the flow cells. If an in-phase relation is not required, the delay coil 136 may be omitted, as there will still be a direct relation between the series of containers and the chart provided by the recorder. If a fresh container is advanced every ten minutes, then ten-minute increments may be advantageously printed along the abscissa of the record chart. The chart may be visually inspected to determine which of the series of containers received fractions of the effluent which are of interest. These fractions are already desalted and may be further processed directly.

Subject matter shown and described, but not claimed in U.S. Patent No. 3,341,229, issued to George N. Catravas of Sept. 12, 1967.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What we claim is:

1. A method of preparing a plurality of quantities of different peptides, comprising: separating the peptides through an ion-exchange resin by means of a continuous buffer eluent to provide a continuous effluent stream carrying each quantity of identic peptides in a fraction of the stream; continuously passing the effluent stream between ion-exchange membranes under electrolysis thereby removing any strongly ionic salts of the eluent from the stream; and dividing the desalted stream into serial fractions and storing each fraction seriatim.

2. A method according to claim 1 further including continuously passing an alkali electrolyte stream on one side, remote from said effluent stream, of one of said membranes which is a cation exchange membrane; and continuously passing an acidic electrolyte stream on one side, remote from said effluent stream, of the other of said membranes which is an anion exchange membrane.

3. A method of preparing and identifying a plurality of quantities of different peptides, comprising: separating the peptides through an ion-exchange resin by means of a continuous buffer eluent to provide a continuous effluent stream carrying each quantity of identic peptides in a fraction of the stream; continuously dividing the effluent stream into a continuous first and second substream; continuously ninhydrin reacting the first substream; continuously measuring the light transmission of the reacted first substream and recording this measurement as a first signal level varying from a baseline with time and having a given chronological relation to the passage of the stream at division; continuously passing the second substream between ion-exchange membranes under electrolysis thereby removing any strongly ionic salts from the substream; continuously storing the desalted substream by collecting and storing fractions thereof seriatim, the duration of the interval of the collection of each fraction having a given chronological relation to the passage of the stream at division; and inspecting the area between the first recorded signal level and the baseline for the interval equivalent to each stored desalted fraction of the second substream.

4. Apparatus for preparing and identifying a plurality of quantities of different peptides carried successively in a liquid stream, comprising: first means for dividing the liquid stream into concurrently phased first and second substreams; second means coupled to said first means for receiving the first substream therefrom and for continuously ninhydrin reacting the second substream; third means coupled to said second means for receiving the ninhydrin reacted second substream and for continuously measuring the light transmission of the ninhydrin reacted first stream and for continuously providing an analogue signal responsive thereto; fourth means coupled to said third means for receiving and for continuously recording the analogue signal in the given phase relation to the passage of the liquid stream through said first means; first, second and third elongated, coextensive and serially adjacent chambers; an anion ion-exchange membrane, elongated, coextensive with and disposed between said first and second chambers and providing an ion flow communication therebetween along its length; a cation ion-exchange membrane, elongated, coextensive with and disposed between said second and third chambers and providing an ion flow communication therebetween along its length; an anode, elongated, coextensive with and disposed in juxtaposition with said first chamber and in ion flow communication therewith along its length; a cathode, elongated, coextensive with and disposed in juxtaposition with said third chamber and in ion flow communication therewith along its length; three inlets, each disposed at one end of each of said chambers, respectively; three outlets, each disposed at the other end of each of said chambers respectively; first supply means coupled to said inlet of said first chamber for supplying an alkali electrolyte thereto; said first means being coupled to said inlet of said second chamber for supplying the second substream thereto; second supply means coupled to said inlet of said third chamber for supplying an acidic electrolyte thereto; current supply means coupled between said anode and said cathode; and fifth means coupled to said outlet of said second chamber for receiving the desalted third substream therefrom and for serially storing fractions of the desalted third stream in phased relation to the passage of the liquid stream through said first means; whereby each stored fraction of the third substream is correlated with those portions of the analogue signal which resulted from the processing of the identic fractions of the first substream.

5. A method of preparing and identifying a plurality of quantities of different peptides, comprising: separating the peptides through an ion-exchange resin by means of a continuous buffer eluent to provide a continuous effluent stream carrying each quantity of identic peptides in a fraction of the stream; continuously dividing the effluent stream into a continuous first, second and third substream; continuously alkali hydrolyzing and ninhydrin reacting the first substream; continuously measuring the light transmission of the reacted first substream and recording this measurement as a first signal level varying from a baseline with time and having a given chronological relation to the passage of the stream at division; continuously ninhydrin reacting the second substream; continuously measuring the light transmission of the reacted second substream and recording this measurement as a second signal level varying from a baseline with time and having the same chronological relation to the passage of the stream at division as the first signal; continuously passing the third substream between ion-exchange membranes under electrolysis thereby removing any strongly ionic salts from the substream; continuously storing the desalted substream by collecting and storing fractions thereof seriatim, the duration of the interval of the collection of each fraction having another given chronological relation to the passage of the stream at division; and comparing the area between the first recorded signal level and the baseline with the area between the isochronal second recorded signal level and the baseline for the interval equivalent to each stored fraction of the third desalted substream.

6. Apparatus for preparing and identifying a plurality of quantities of different peptides carried successively in a liquid stream, comprising: first means for dividing the liquid stream into concurrently phased first, second and third substream; second means coupled to said first means for receiving the first substream therefrom and for continuously alkali hydrolyzing the first substream; third means coupled to said second means for receiving the hydrolyzed first substream and for continuously ninhydrin reacting the hydrolyzed first substream; fourth means coupled to said third means for receiving the ninhydrin reacted first substream and for continuously providing a first analogue signal responsive thereto; fifth means coupled to said fourth means for receiving and for continuously recording the first analogue signal in a given phase relation to the passage of the liquid stream through said first means; sixth means coupled to said first means for receiving the second substream therefrom and for continuously ninhydrin reacting the second substream; seventh means coupled to said sixth means for receiving the ninhydrin reacted second substream and for continuously measuring the light transmission of the ninhydrin reacted second stream and for continuously providing a second analogue signal responsive thereto; said fifth means also coupled to said seventh means for receiving and for continuously recording the second analogue signal in the given phase relation to the passage of the liquid stream through said first means and in isochronism with the first analogue signal, first, second and third elongated, coextensive and serially adjacent chambers; and anion ion-exchange membrane, elongated, coextensive with and disposed between said first and second chambers and providing an ion flow communication therebetween along its length; a cation ion-exchange membrane, elongated, coextensive with and disposed between said second and third chambers and providing an ion flow communication therebetween along its length; an anode, elongated, coextensive with and disposed in juxtaposition with said first chamber and in ion flow communication therewith along its length; a cathode, elongated, coextensive with and disposed in juxtaposition with said third chamber and in ion flow communication therewith along its length; three inlets, each disposed at one end of each of said chambers, respectively; three outlets, each disposed at the other end of each of said chambers respectively; first supply means coupled to said inlet of said first chamber for supplying an alkali electrolyte thereto; said first means being coupled to said inlet of said second chamber for supplying the third substream thereto; second supply means coupled to said inlet of said third chamber for supplying an acidic electrolyte thereto; current supply means coupled between said anode and said cathode; and eighth means coupled to said outlet of said second chamber for receiving the desalted third substream therefrom and for serially storing fractions of the desalted third stream in phased relation to the passage of the liquid stream through said first means; whereby each stored fraction of the third substream is correlated with those portions of the first and second analogue signals which resulted from the processing of the identic fractions of the first and second substreams.

References Cited

UNITED STATES PATENTS

| | | | |
|---|---|---|---|
| 2,636,852 | 4/1953 | Juda et al. | 210—23 XR |
| 2,710,715 | 6/1955 | Gorham. | |
| 3,341,299 | 9/1967 | Catravas | 23—253 XR |

FOREIGN PATENTS 209,274   5/1960   Germany.

OTHER REFERENCES

Rollins, C., Jensen, L., Schwartz, A.N., Anal. Chem. 34, No. 6, May 1962, pp. 711–712.

Schroeder, W. A., Jones, R. T., Cormick, J., McCalla, K., Anal. Chem. 34, No. 12, November 1962, pp. 1570–1575.

MORRIS O. WOLK, Primary Examiner.

R. M. REESE, Assistant Examiner.